United States Patent
Bhat et al.

(10) Patent No.: US 11,650,761 B1
(45) Date of Patent: May 16, 2023

(54) DATA PROTECTION DURING CONCURRENT OPERATIONS FOR MULTIPLE ACTUATOR DATA STORAGE DEVICES

(71) Applicant: Western Digital Technologies, Inc., San Jose, CA (US)

(72) Inventors: Shravankumar Bhat, Broomfield, CO (US); Hideaki Ito, Kanagawa-ken (JP); Christopher Wiederholt, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 9 days.

(21) Appl. No.: 17/511,917

(22) Filed: Oct. 27, 2021

(51) Int. Cl.
| | | |
|---|---|---|
| *G11B 5/55* | (2006.01) | |
| *G11B 20/12* | (2006.01) | |
| *G06F 3/06* | (2006.01) | |
| *G11B 5/012* | (2006.01) | |

(52) U.S. Cl.
CPC .......... *G06F 3/0659* (2013.01); *G06F 3/0604* (2013.01); *G06F 3/0676* (2013.01); *G11B 5/012* (2013.01)

(58) Field of Classification Search
CPC ............ G11B 5/5578; G11B 2020/234; G11B 2020/292; G11B 5/012; G11B 2020/1217; G11B 2020/1218; G11B 2020/1224; G11B 2020/1292; G11B 5/09
USPC ........................................................ 360/75
See application file for complete search history.

(56) References Cited

U.S. PATENT DOCUMENTS

| | | | |
|---|---|---|---|
| 5,570,244 | A | 10/1996 | Wiselogel |
| 6,215,608 | B1 | 4/2001 | Serrano et al. |
| 6,493,172 | B1 | 12/2002 | Morris et al. |
| 7,400,467 | B1 | 7/2008 | Calihan et al. |
| 9,792,938 | B1 | 10/2017 | Kobayashi et al. |
| 10,037,779 | B1 | 7/2018 | Mendonsa et al. |
| 10,482,911 | B1 * | 11/2019 | Nanjunda Swamy ....................... G06F 11/2087 |
| 2018/0358039 | A1 | 12/2018 | Keshavan et al. |

OTHER PUBLICATIONS

Seagate Blog, "Multi Actuator Technology: A New Performance Breakthrough," at least as early as Aug. 16, 2019, retrieved from https://blog.seagate.com/craftsman-ship/multi-actuator-technology-a-new-performance breakthrough/ on Aug. 16, 2021, 6 pgs.

* cited by examiner

*Primary Examiner* — Nabil Z Hindi
(74) *Attorney, Agent, or Firm* — Patent Law Works LLP (57) ABSTRACT

Example systems, data storage devices, and methods to provide data protection during concurrent operations for multiple actuator data storage devices are described. The data storage device includes a plurality of actuators configured to actuate a plurality of heads over different subsets of a plurality of disk surfaces. Responsive to receiving a write command for one of the actuators, the coupling state with at least one other of the actuators is determined and execution of write commands is inhibited if the coupling state indicates a possible coupling event. The inhibit of the write commands in the presence of coupling events may prevent off-track writes and protect data.

20 Claims, 7 Drawing Sheets

DATA PROTECTION DURING CONCURRENT OPERATIONS FOR MULTIPLE ACTUATOR DATA STORAGE DEVICES

TECHNICAL FIELD

The present disclosure relates to data storage devices using multiple actuators for concurrent operations. In particular, the present disclosure relates to data protection during concurrent operations.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. Some disk drives may be equipped with multiple sets of actuator arms, where each set of actuator arms has a separate VCM and the ability to pivot independent of the other sets of actuator arms. Disk drives with this configuration may be referred to as multiple actuator data storage devices or split pivot actuator drives and may include two or more independent sets of actuator arms.

Figure 1:
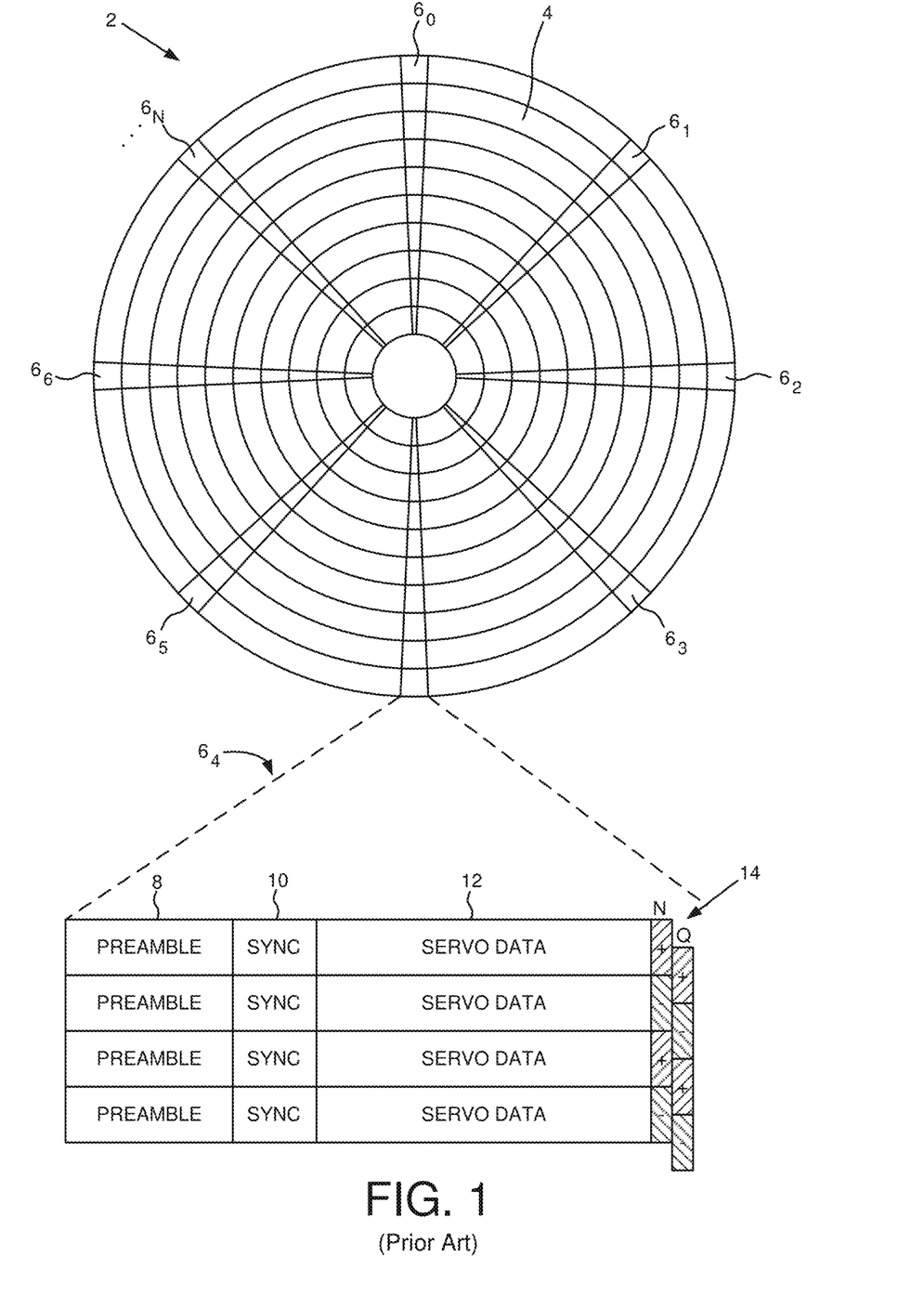
FIG. 1 is a diagram of a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase-based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., the VCM) in order to actuate the head radially over the disk in a direction that reduces the PES. Each VCM in a multiple actuator data storage device may have its own servo controller and associated PES to govern positioning of that set of actuator arms and associated heads.

While each VCM and associated servo controller may enable independent operation of the respective sets of actuators, the sets of actuators are still in the same disk drive, generally operating on the same pivot and disk stack, and supported by interconnected controller electronics. Therefore, coupling may still occur between the sets of actuators and, depending on the respective operating states of the sets of actuators, this coupling may disrupt servo positioning and create a data protection risk (such as loss of data due to off-track writes).

There is a need for technology that provides proactive data protection from the coupling events in multiple actuator data storage devices.

SUMMARY

Various aspects for data protection during concurrent operations for multiple actuator data storage devices, particularly selective application of a proactive write inhibit based on a coupling status of other actuators.

One general aspect includes a data storage device including: a plurality of disk surfaces; a first actuator configured to actuate a first plurality of heads over a first subset of the plurality of disk surfaces; a second actuator configured to actuate a second plurality of heads over a second subset of the plurality of disk surfaces; and control circuitry. The control circuitry is configured to: receive a write command for the first actuator; determine a coupling state of the second actuator; and inhibit, responsive to the coupling state, execution of the write command.

Implementations may include one or more of the following features. The control circuitry may be further configured to determine at least one state identifier for the second actuator and compare the at least one state identifier to a set of state identifiers corresponding to coupling events between the first actuator and the second actuator, where determining the coupling state is based on the comparison of the at least one state identifier to the set of state identifiers. The set of state identifiers may be selected from state identifiers corresponding to at least one of the following: load/unload state identifiers of the second actuator; sweep operation state identifiers of the second actuator; and servo error recovery state identifiers of the second actuator. The coupling events between the first actuator and the second actuator may include mechanical coupling events and electrical coupling events. The control circuitry may include: a first controller configured to control the first actuator; and a second controller configured to control the second actuator. The second controller may be configured to: determine the at least one state identifier for the second actuator; and send, to the first controller, the at least one state identifier for the second actuator. The first controller may be configured to: determine the coupling state of the second actuator; and inhibit, responsive to the coupling state, execution of the write command. The first controller may be further configured to: store the at least one state identifier received from the second controller; read, responsive to receiving the write command, the at least one state identifier; and compare the at least one state identifier to the set of state identifiers to determine the coupling state of the second actuator. The second controller may be further configured to selectively send, based on a set of message notification conditions, the at least one state identifier to the first controller. Inhibiting execution of the write command may include determining, based on the at least one state identifier, a delay condition before the write command is executed. The control circuitry may be further configured to determine the coupling state of the second actuator on a per servo sector basis. The data storage device may further include a plurality of additional actuators configured to actuate additional pluralities of heads of additional subsets of the plurality of disk surfaces. The control circuitry may be further configured to: determine a coupling state for each actuator of the plurality of additional actuators; and inhibit, responsive to the coupling state of at least one actuator of the plurality of additional actuators, execution of the write command.

Another general aspect includes a method including: receiving, by a data storage device, a write command for a first actuator; determining a coupling state of a second actuator; and inhibiting, responsive to the coupling state, execution of the write command. The data storage device may include: a plurality of disk surfaces; the first actuator configured to actuate a first plurality of heads over a first subset of the plurality of disk surfaces; and a second actuator configured to actuate a second plurality of heads over a second subset of the plurality of disk surfaces.

Implementations may include one or more of the following features. The method may include: determining at least one state identifier for the second actuator; and comparing the at least one state identifier to a set of state identifiers corresponding to coupling events between the first actuator and the second actuator, where determining the coupling state is based on the comparison of the at least one state identifier to the set of state identifiers. The set of state identifiers may be selected from state identifiers corresponding to at least one of the following: load/unload state identifiers of the second actuator; sweep operation state identifiers of the second actuator; and servo error recovery state identifiers of the second actuator. The coupling events between the first actuator and the second actuator may include mechanical coupling events and electrical coupling events. The method may include: determining, by a second controller configured to control the second actuator, the at least one state identifier for the second actuator; sending, from the second controller to a first controller, the at least one state identifier for the second actuator; determining, by the first controller configured to control the first actuator, the coupling state of the second actuator from the at least one state identifier; and inhibiting, by the first controller and responsive to the coupling state, execution of the write command. The method may include: storing, by the first controller, the at least one state identifier received from the second controller; reading, by the first controller and responsive to receiving the write command, the at least one state identifier; and comparing, by the first controller, the at least one state identifier to the set of state identifiers to determine the coupling state of the second actuator. Sending, from the second controller to the first controller, may include: evaluating, by the second controller, a set of message notification conditions; and selectively sending, based on the set of message notification conditions, the at least one state identifier to the first controller. Inhibiting execution of the write command may include determining, based on the at least one state identifier, a delay condition before the write command is executed. Determining the coupling state of the second actuator may be executed on a per servo sector basis.

Still another general aspect includes a data storage device including: a plurality of disk surfaces; a first actuator configured to actuate a first plurality of heads over a first subset of the plurality of disk surfaces; a second actuator configured to actuate a second plurality of heads over a second subset of the plurality of disk surfaces; means for receiving a write command for the first actuator; means for determining a coupling state of the second actuator; and means for inhibiting, responsive to the coupling state, execution of the write command.

The present disclosure describes various aspects of innovative technology capable of preventing off-track writes to protect data in multiple actuator data storage devices. The various embodiments include operations and control circuitry to overcome or at least reduce issues previously encountered in multiple actuator data storage devices and, accordingly, are more reliable than other multiple actuator data storage devices. That is, the various embodiments disclosed herein include hardware and/or software with functionality to improve storage operation processing during concurrent operations, such as by using the selective application of a proactive write inhibit based on a coupling status of other actuators in a multiple actuator data storage device. Accordingly, the embodiments disclosed herein provide various improvements to multiple actuator data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Figure 2A:
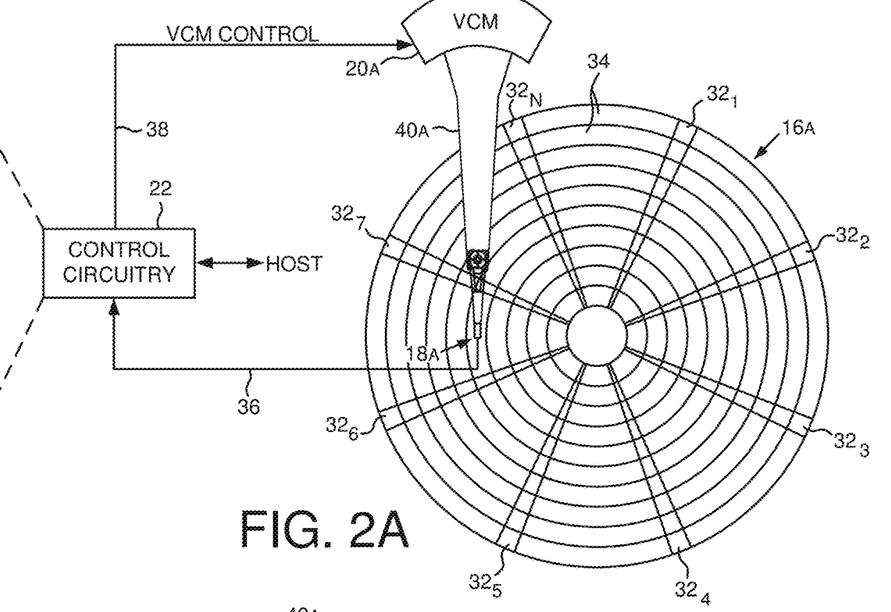
FIG. 2A is a diagram of an example data storage device in the form of a disk drive comprising a head actuated over a disk surface.
Figure 2B:
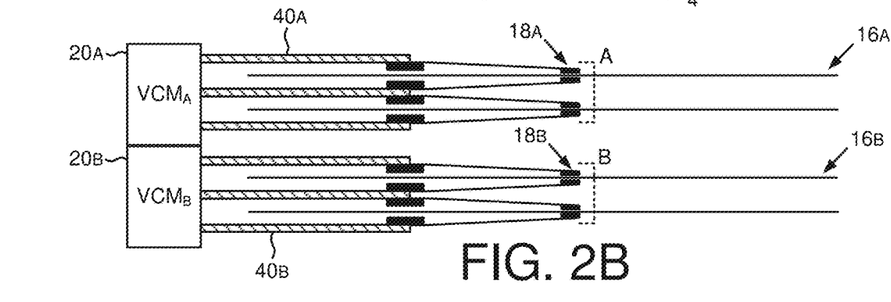
FIG. 2B is a diagram of an example multiple actuator data storage device comprising a split actuator with a first VCM actuating a first subset of actuator arms and a second VCM actuating a second subset of actuator arms.

FIGS. 2A and 2B show a data storage device in the form of a disk drive according to an embodiment comprising a plurality of disk surfaces (e.g., 16A and 16B). A first plurality of heads (e.g., 18A) are actuated over a first subset of the disk surfaces (e.g., 16A) by a first actuator (e.g., 20A), and a second plurality of heads (e.g., 18B) are actuated over a second subset of the disk surfaces (e.g., 16B) by a second actuator (e.g., 20B). While two actuators (e.g., 20A and 20B) are shown in FIGS. 2A and 2B, multiple actuator data storage device configurations may include any number of actuators and corresponding subsets of the plurality of disk surfaces. For example, disk drives may be configured with a plurality of actuators including three, four, or more actuators that are independently controlled for concurrent operations through their respective heads and servo electronics. In some embodiments, each actuator may include one or more actuator stages. For example, an actuator may include a VCM stage for gross positioning and one or more additional motor controls for fine positioning of the heads at different scales, such as a milli-controller stage, a micro-controller stage, etc.

Figure 2C:
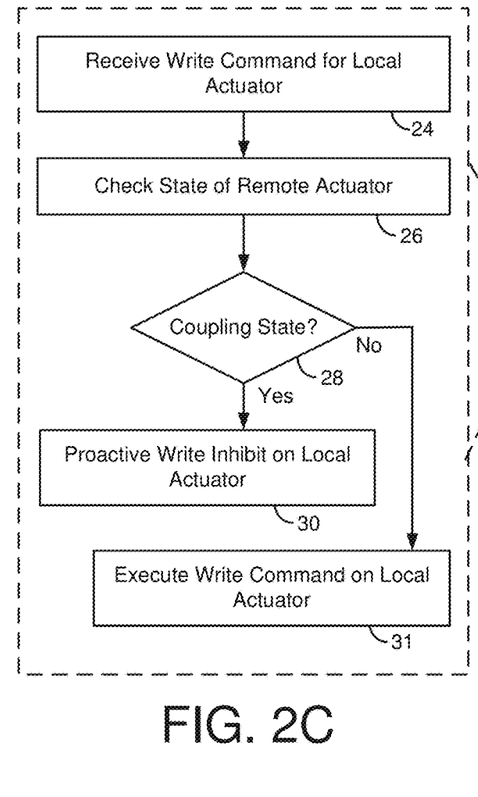
FIG. 2C is a flow diagram of an example method for data protection during concurrent operations that may be implemented in the control circuitry of FIG. 2A for the split actuator configuration of FIG. 2B.

The disk drive further comprises control circuitry 22 configured to execute the flow diagram of FIG. 2C for executing concurrent operations with data protection. For example, the disk drive in FIGS. 2A and 2B may include on-board electronics comprising one or more systems on a chip (SOC), application-specific integrated circuits (ASICs), and/or other data or signal processing components attached to a printed circuit board assembly (PCBA) and/or other interconnects (such as the flex connector to the actuators). Control circuitry 22 may include circuits, processors, memory devices, and software or firmware executed therein for completing various data and signal processing tasks, including control of actuators 20A and 20B and read-write operations through heads 18A and 18B. In some embodiments, control circuitry 22 may include distinct servo control and read/write channel paths for each actuator 20A and 20B and their respective subsets of disk surfaces (and data written thereon).

In the embodiment of FIG. 2A, each disk surface (e.g., 16A) comprises a plurality of servo sectors $32_1$-$32_N$ that define a plurality of servo tracks 34, wherein data tracks are defined relative to the servo tracks at the same or different radial density. The control circuitry 22 processes a read signal 36 emanating from the head to demodulate the servo sectors and generate a position error signal (PES) representing an error between the actual position of the head and a target position relative to a target track. A servo control system in the control circuitry 22 filters the PES using a suitable compensation filter to generate a control signal 38 applied to a coarse actuator (e.g., VCM actuator 20A) which rotates an actuator arm (e.g., 40A) about a pivot in order to actuate the corresponding heads radially over the disk surfaces in a direction that reduces the PES. The heads may also be servoed using a fine actuator, such as a piezoelectric (PZT) actuator, configured to actuate a suspension relative to the actuator arm, and/or configured to actuate the head relative to the suspension. The servo sectors $32_1$-$32_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2B, the first and second VCM actuators 20A and 20B rotate the respective set of actuator arms (e.g., 40A and 40B) about a common pivot in what has been referred to as a split actuator design. In another embodiment, a first and second VCM may be configured to actuate a respective set of actuator arms about a separate pivot, for example, mounted at different circumferential locations about the disks. Other embodiments may employ more than two actuators, for example, an embodiment employing more than two actuators actuated about a common pivot or an embodiment employing multiple split actuators mounted at different circumferential locations about the disks.

Control circuitry 22 may include firmware configured to execute an example method for executing concurrent operations with data protection in FIG. 2C. The method in FIG. 2C is described from the perspective of controlling write operations through heads 18A on actuator 20A as the local actuator, with actuator 20B being the remote actuator that may generate coupling events during its concurrent operations. The method in FIG. 2C may equally apply to write operations through heads 18B on actuator 20B as the local actuator and actuator 20A being the remote actuator.

At block 24, a write command may be received for the local actuator. For example, the disk drive may receive or generate a write command targeting data blocks to be stored on the subset of disk surfaces engaged by actuator 20A.

At block 26, the state of the remote actuator may be checked. For example, the disk drive may maintain state identifiers for various conditions and/or operations, such as servo operations of actuator 20B.

At block 28, whether the state of the remote actuator corresponds to a coupling state may be determined. For example, the disk drive may check whether the current state identifiers for actuator 20B correspond to servo operations likely to induce coupling events in actuator 20A. If a coupling state is indicated, then the method continues to block 30. If no coupling state is indicated, then the method continues to block 31.

At block 30, a proactive write inhibit may be initiated on the local actuator. For example, the disk drive may trigger a write inhibit that delays execution of the write command on actuator 20A until the coupling event with actuator 20B has passed.

At block 31, the write command may be executed on the local actuator. For example, the disk drive may process the write command as normal on actuator 20A, since no coupling event is anticipated that might cause an off-track write.

Figure 3:
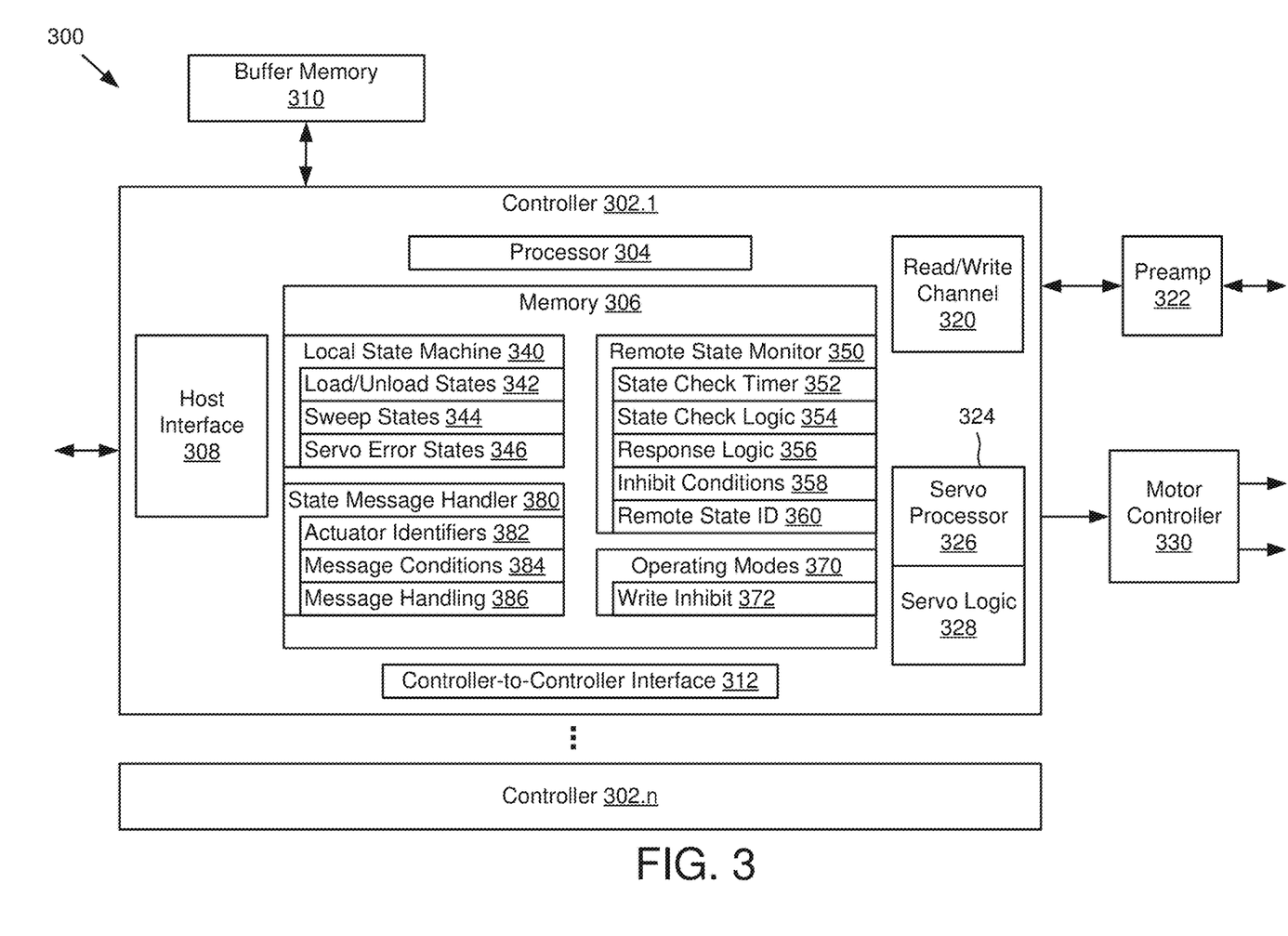
FIG. 3 is a block diagram of a configuration of data storage device electronics for data protection during concurrent operations in a multiple actuator data storage device.

FIG. 3 shows a portion of example control circuitry 300 for a multiple actuator data storage device, such as the disk drives of FIGS. 2A-2C. In the example shown, control circuitry 300 may include one or more controllers 302.1-302.n. Controller 302.1 may comprise a storage device controller configured to receive host storage commands, process storage operations for writing, reading, and managing data stored to non-volatile storage media in the disk drive, such as the magnetic media disks in FIGS. 2A and 2B. In some embodiments, each controller 302.1-302.n may correspond to a separate host interface and read/write path to a subset of disk surfaces corresponding to a different actuator. In some embodiments, controller 302.1 may be configured to manage servo and read/write operations for multiple actuators.

Controllers 302 may comprise a processor 304, a memory 306, a host interface 308, and access to a buffer memory 310. Controllers 302 may also comprise a controller-to-controller interface 312, a read/write channel 320, and a servo controller 324 including a servo processor 326 and servo logic 328. In some embodiments, one or more of host interface 308, controller-to-controller interface 312, read/write channel 320, and servo controller 324 may be embodied in separate packages, such as ASICs, SOCs, or other specialized circuits that interface with processor 304 and memory 306 for carrying out their respective functions. Controllers 302 may include physical and electrical interfaces for connecting to buffer memory 310, preamp 322, motor controller 330, other controllers, and/or other circuitry components. In some embodiments, the components of controllers 302 may be interconnected by a bus that includes one or more conductors that permit communication among the components. For example, processor 304, memory 306, host interface 308, controller-to-controller interface 312, read/write channel 320, and/or servo controller 324 may be components attached to a PCBA that provides one or more layers of interconnect conductors among the components.

Processor 304 may include any type of conventional processor or microprocessor that interprets and executes instructions. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store firmware instructions comprising one or more modules or sub-modules for specific data storage device operations and processor 304 may execute those instructions, including controlling communication with other components, such as host interface 308, buffer memory 310, controller-to-controller interface 312, read/write channel 320, and servo controller 324.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces of the storage device.

Controller-to-controller interface 312 may include a bus interface and protocols for low-level bus communication between or among components in control circuitry 300. For example, controller-to-controller interface 312 may support messaging between controller 302.1 and other controllers, such as controller 302.n, using inter-integrated circuit (I2C) communication protocols. Controller-to-controller interface 312 may be invoked by processor 304 for communication across controllers responsible for different actuators in a multiple actuator data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, write precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. Read/write channel 320 may provide the analog write signal to and receive the analog read signal from preamp 322, which controls and amplifies signals to and from the heads.

Servo controller 324 may include one or more specialized circuits configured to process servo data, such as position error signals, from the disk surfaces and providing a control signal to position the actuators in a closed-loop control system. Servo controller 324 may also receive commands from processor 304 for positioning operations, such as seek, track follow, load, unload, sweep, idle, and other actuator positioning operations. Servo controller 324 may also implement servo error recovery processes for recovering from servo errors. In some embodiments, servo controller 324 may include servo processor 326 and servo logic 328 (stored in a servo memory). For example, servo processor 326 may be a dedicated processor circuit and servo logic 328 may be firmware stored in RAM associated with the dedicated processor to provide dedicated computing resources for managing the servo functions. Servo controller 324 may provide servo control signals to motor controller 330 and motor controller 330 may control one or more actuator VCMs and/or a spindle motor for rotating the disk stack.

Control circuitry 300 may include a plurality of modules or subsystems that are stored and/or instantiated in memory 306 for execution by processor 304 as instructions or operations. For example, memory 306 may include a local state machine 340 configured for managing operational states of servo controller 324 and the corresponding local actuator. Memory 306 may include a remote state monitor 350 configured to enable a local actuator to monitor the operational states of remote actuators for determining responses to coupling events. Memory 306 may include operating modes 370 configured to determine operating constraints for processing data operations through controller 302. In some embodiments, memory 306 may include a state message handler 380 configured for communication between local state engine 340 for a controller corresponding to one or more actuators and remote state monitor 350 for another controller corresponding to a different actuator or actuators. In some configurations, a single controller may include servo control and read/write channels for multiple actuators and remote state monitor 350 for one actuator may be able to communicate directly with local state engine 340 for other actuators in order to determine relevant state information.

Local state machine 340 may include a set of functions, parameters, and data structures for managing the operating state or states of each actuator and/or corresponding servo controller. For example, one or more state machines may operate within controller 302 to determine state information related to system-level and sub-system or component level operations. The state machines may include logic for determining parameters and events that trigger various states and data structures for storing those states in the form of state identifiers, such as alphanumeric strings uniquely identifying each state and stored to an active state memory location or otherwise indicated as representing a present state of operation. Local state engine 340 may include the state machine managing servo states for a particular actuator. In some embodiments, each actuator and corresponding servo controller may have an associated state machine in at least one controller. Local state machine 340 may refer to the state machine associated with an actuator that provides the current state information for that actuator. Each actuator may have an associated local state machine 340. In some embodiments, a single state machine may monitor state information for a plurality and/or all actuators and maintain state identifiers associated with particular actuator and/or servo controller identifiers. In the example shown, local state machine 340 manages servo-related state information. In some embodiments, local state machine 340 may include state identifiers and state types supporting additional components, such as read/write channel states, host interface and/or controller-to-controller interface states, power management states, and/or operating states corresponding to operating modes 370.

In some embodiments, local state machine 340 may be configured to manage a variety of state types and corresponding state identifiers for describing various servo operations. For example, local state machine 340 may include load/unload states 342, sweep states 344, and servo error states 346. This may be a non-exhaustive list of states managed by local state machine 340, such as seek states, track follow states, and other operating states. Load/unload states 342, sweep states 344, and servo error states 346 may correspond to possible coupling events that could disrupt concurrent operations on other actuators due to mechanical coupling events or electrical coupling events. For example, mechanical coupling events may include motion or vibration from the operation of the remote actuator changing the physical position of the heads on the local actuator. Electrical coupling events may include electrical signals and/or magnetic flux from the operations of the remote actuator changing the operation of the local actuator.

Each state type may include a plurality of state identifiers corresponding to specific servo operation states, where only one state identifier may represent the present state of the actuator at any given time. For example, load/unload states 342 may include load/unload state identifiers like LOADED, UNLOADED, LOADING, and UNLOADING. Specific states may be more or less likely to induce coupling in other actuators. For example, LOADED and UNLOADED may be good states that are unlikely to create coupling events with other actuators, while LOADING and UNLOADING are more likely to create coupling events with other actuators. Additional states related to load/unload states 342 and related positions and calibrations may include CALIBRATING, (back electromotive force) BEMF_MOVING, FLOATING, (inner diameter) ID_SEARCHING, (outer diameter) OD_SEARCHING, (unload) UL_CALIBRATING, BEMF_CHECKING, RETRACTING, and WAITING. In each of these additional states, the actuator motion or fields may induce a coupling event with another actuator. In some examples, the only safe load/unload states 342 may be LOADED (normal operating mode) and UNLOADED (safely parked and latched).

In some drive configurations, sweep states 344 may include system maintenance operations that sweep the actuators across the disk surfaces, often contacting the crash stops at either end of the range of motion. Sweep states 344 may include sweep operation state identifiers for ID_SWEEPING and ID_SWEEP_WAITING. Both of these states may be likely to induce coupling events in other actuators. In some embodiments, states that risk contact with ID or OD crash stops may be likely coupling events. Additional sweep operation state identifiers may be used for additional sweep operations or operation substrates in some configurations.

In some embodiments, servo error states 346 may include servo error recovery modes of operation in response to a loss of servo lock. For example, when a loss of servo lock occurs in servo controller 324, servo controller 324 may initiate a servo recovery mode that includes several stages and corresponding servo error recovery states and state identifiers. In some configurations, serve error recovery may include applying an emergency brake to the VCM and initiating a seek recovery. A BRAKE state or a SEEK RECOVERY IN PROGRESS state may result in coupling events. Completion of the seek recovery and not being in a BRAKE state may not correspond to coupling events. The BRAKE and SEEK RECOVERY IN PROGRESS state identifiers may contrasted with a SEEK RECOVERY COMPLETE state prior to returning to other operations. Additional servo error recovery state identifiers may be used for additional servo error recovery operations or operation substrates in some configurations.

Remote state monitor 350 may include a set of functions, parameters, and data structures for monitoring the operating state or states of each other actuator and/or corresponding servo controller in order to determine whether there is a potential coupling event that requires response. For example, one or more monitors may operate within controller 302 to determine state information related to operations on actuators other than the local actuator that the remote state monitor is supporting. The monitors may include logic for determining state identifiers or other parameters related to detecting possible coupling events, as well as logic for determining how the system or operations on the local actuator should be modified to protect data or otherwise compensate for the coupling event. In some embodiments, remote state monitor 350 may receive or access state information, such as state identifiers, from local state machine 340 instantiated in other controllers or managing states for other actuators. For example, remote state monitor 350 may by managing coupling state responses for a particular actuator. Each actuator and corresponding servo controller may have an associated state machine in at least one controller and remote state monitor 350 may collect the state information from the state machines for each other actuator. Remote state monitor 350 may refer to the state monitor associated with the operating controller for a local actuator that provides the current state information for other (and therefore remote) actuators. In some embodiments, a single state monitor may monitor state information for a plurality and/or all actuators and may, in some configurations, be integrated with a state machine maintaining state identifiers associated with each particular actuator and/or servo controller. Remote state monitor 350 may be configured to monitor any operating states across the components of control circuitry 300. In the example shown, remote state monitor 350 may be configured to monitor servo control states that may be most likely to trigger coupling events. In some embodiments, remote state monitor 350 may monitor state identifiers and state types supporting additional components, such as read/write channel states, host interface and/or controller-to-controller interface states, power management states, and/or operating states corresponding to operating modes 370.

In some embodiments, remote state monitor 350 may include a plurality of hardware and/or software modules configured to use processor 304 and memory 306 to handle or manage defined operations of remote state monitor 350. For example, remote state monitor 350 may include a state check timer 352 configured to determine the trigger conditions for checking the state of one or more actuators. Remote state monitor 350 may include state check logic 354 configured to evaluate the operating state of one or more remote actuators against the operating state or other conditions of the local actuator to determine coupling status. Remote state monitor 350 may include response logic 356 configured to provide rules for responding to coupling status and/or specific combinations of local and remote operating states. Remote state monitor 350 may include inhibit conditions 358 configured to provide a set of conditions for maintaining an operation interrupt or delay, such as a write inhibit mode. In some embodiments, remote state monitor 350 may include a memory location and/or data structure for storing remote state identifiers for use by state check logic 354 between state update events.

State check timer 352 may include logic, parameters, and data structures for determining state check events. For example, state check may be performed on a regular basis, such as on a per servo sector (or servo wedge) basis. That is, after each set of servo bursts and corresponding PES calculation, state check timer 352 may initiate state check logic 354 to check the current operation mode of the local actuator against the current (or last available) operating mode of each remote actuator. In other embodiments, other trigger conditions for state check events may be configured, such as responsive to state change or update events from one or more remote actuators. In some embodiments, state check timer 352 may use logic integrating multiple trigger conditions, such as the per servo sector timing, a remote state change, and a local operating state subject to disruption (such as write mode).

State check logic 354 may include logic, parameters, and data structures for determining whether the operating state of a remote actuator corresponds to a coupling event with local actuator, particularly in light of specific operating modes on the local actuator. For example, state check logic 354 may read the state identifier for one or more remote actuators and process those state identifiers to evaluate whether the state identifier is among a set of state identifiers associated with coupling events. In some embodiments, state check logic 354 may be configured with a list of state identifiers corresponding to coupling events (e.g., based on prior test data) and that set of state identifiers may be compared against the current state identifier to determine whether a coupling state exists. For example, if the state identifier for the current state of the remote actuator is on the list, then a coupling state is identified. If the state identifier for the current state of the remote actuator is not on the list, then no coupling state is identified. In some embodiments, state check logic 354 may include a set of logical rules for evaluating the operating mode of a remote actuator to the operating mode of the local actuator. For example, every combination of remote and local operating modes may be evaluated to determine whether a coupling event is likely to occur and combinations may be designated as corresponding to coupling status or no coupling (or uncoupled) status. The remote state identifier may be used to index the set of coupling state identifiers for state check logic to quickly determine coupling status.

Response logic 356 may include logic, parameters, and data structures for determining how remote state monitor 350 responds to coupling state. For example, response logic 356 may be configured for data protection to prevent off-track writes that could be created by a coupling event during write operations on the local actuator. Responsive to detection of the coupling state by state check logic 354, response logic 356 may initiate a write inhibit to prevent write operations during the possible coupling event. Response logic 356 may be configured to define the trigger conditions for such proactive write inhibits based on remote state information. In some embodiments, response logic 356 may support additional operation inhibits or delays to prevent errors from coupling events. For example, response logic 356 may include rules for inhibiting operations other than writes based on coupling status, where the coupling event could trigger undesirable read errors, calibration errors, crashes, etc.

Inhibit conditions 358 may include logic, parameters, and data structures for determining how long the response to the coupling state lasts and/or what the end conditions are for removing the inhibit mode. For example, inhibit conditions 358 may operate in conjunction with state check logic 354 to determine when the coupling state ends and normal (uncoupled) operation may resume. In some embodiments, inhibit conditions 358 may be based on an inhibit window that defines a fixed period after determination of the coupled state during which the inhibit mode continues. When the time period ends or times out, normal operation resumes. In some embodiments, inhibit conditions may be specific to the combination of local and remote operating modes that triggered the coupling state. For example, each remote state identifier that triggers a coupling state may include a corresponding set of inhibit conditions that determine when the response ends, such as an inhibit time value, a specific state change, or a combination thereof.

Remote state identifier 360 may include a memory location or data structure for receiving and storing remote state identifiers. In some configurations, remote state monitor 350 may not have direct, real-time access to the remote state identifiers of other actuators and may rely on a messaging pathway, such as state message handler 380. It may be beneficial to have a repository or data table for storing the most recent state identifier(s) for one or more actuators to support state check logic 354 independent of the state identifier update timing through state message handler 380.

Operating modes 370 may include a set of interfaces, functions, parameters, and data structures for managing the operating state or states of the actuators, controller, and/or storage device as a whole. Control circuitry 300 may support a number of operating modes at various levels of system or component granularity. In some embodiments, operating modes 370 may include operating modes on a per actuator basis that are monitored by local state machine 340 and/or remote state monitor 350. In some configurations, operating modes may include: spin up, start up, seek, write, read, active, multiple idle modes, and multiple standby modes. For example, spin up and start up may include a series of actions to prepare the mechanics and electronics of the storage device to reach a ready state. Seek, write, and read may correspond to storage command operating modes for each type of operation. Active may be a ready state for immediate execution of one the storage command operating modes and various idle and standby modes may include various power saving and reduced operating modes. In some embodiments, operating modes 370 may include other types of limited duration operating modes based on various trigger conditions, such as servo error recovery mode or a write inhibit mode 372. In some embodiments, inhibit modes may include modes that temporarily delay execution of storage command operating modes (or other modes) to allow for a condition, such as a coupling state, to pass before completion of the normal operating mode. For example, write inhibit mode 372 may be invoked to stop write operations, even during a normal write operating mode. Write inhibit mode 372 may be configured to delay processing of write operations during an operating period corresponding to a coupling state and possible coupling event, in order to prevent off-track writes and possible data loss. Upon removal write inhibit mode 372, normal write operations may return and delayed write operations may be completed. In some configurations, write commands or operations may be rejected during write inhibit mode 372 (and may return an appropriate error or status code) and those write operations may be retried once write inhibit mode 372 is removed, pursuant the operation queuing, allocation, and retry logic of the storage device.

State message handler 380 may include a set of interfaces, functions, parameters, and data structures for enabling local state machines 340 associated with one actuator to communicate with remote state monitor 350, even if they are in different controllers or processor/memory domains. For example, state message handler 380 may be configured as a controller-to-controller messaging interface to use controller-to-controller interface 312 to send state identifier values between controller 302.1 and controller 302.n. In some embodiments, state message handler 380 may support a transport and messaging protocol for communication over a bus among integrated circuits of control circuitry 300. For example, a master-slave or peer-to-peer configuration may support passing binary encoded messages including routing and payload information between components.

In some embodiments, state message handler 380 may include a plurality of hardware and/or software modules configured to use processor 304 and memory 306 to handle or manage defined operations of state message handler 380. For example, state message handler 380 may include actuator identifiers 382 or other unique identifiers (controller identifiers associated with one or mora actuators) configured for routing messages between components. State message handler 380 may include message conditions 384 configured to determine when messages, such as state inquires/responses or state change notification messages, are sent between the components. For example, message notification conditions in message conditions 384 may include logic for evaluating states from local state machine 340, time-based conditions, and/or request response conditions for providing notifications from one actuator controller to another actuator controller. State message handler 380 may include message handling 386 configured to format and send messages from one component and receive and parse messages received by a component.

Figure 4:
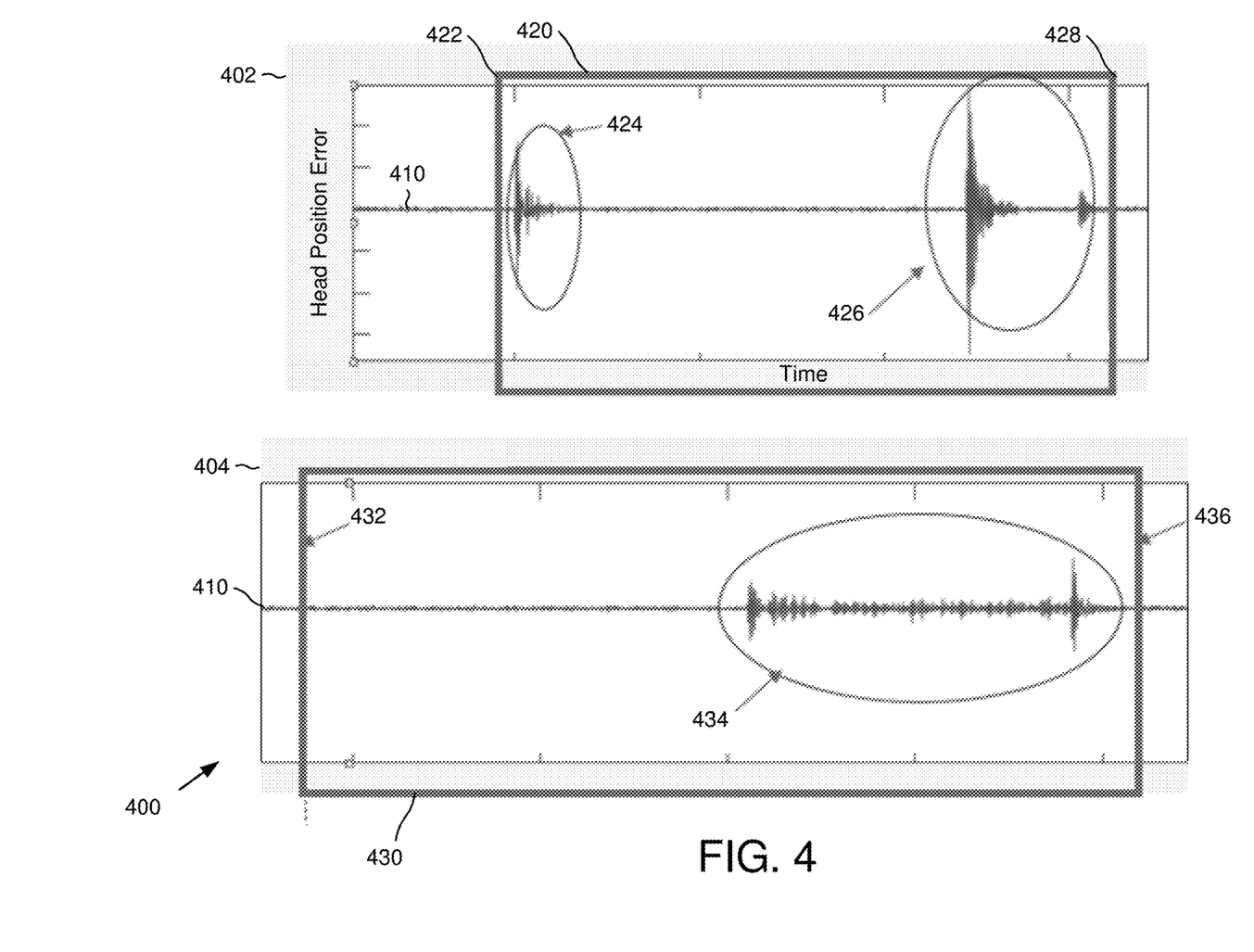
FIG. 4 is an example graph of position error signals during example coupling events with another actuator.

FIG. 4 shows a graph 400 of an example PES response to various coupling events across time periods 402 and 404. Time is on the x-axis and head position error is on the y-axis, measured from the 0 position of track center. PES 410 may provide the error signal for track follow during a normal read, write, or other track follow operation on a local actuator and the PES disturbances created by coupling events from a remote actuator.

In time period 402, a servo error occurs triggering a brake state of the remote actuator. A write inhibit window 420 may be triggered on the local actuator from a start 422 of the coupling state (as determined by the brake state change) and avoid writing during the first coupling event 424 that represents coupling from the application of the emergency brake to the remote actuator. Write inhibit window 420 continues to write inhibit end 428, which is based on inhibit conditions that do not remove the inhibit state until after the coupling event 426 from the remote actuator hitting the ID crash stop to complete the brake operation. The use of status information, which leads and lags these emergency operations may enable the write inhibit to proactively prevent writing during the inhibit window without otherwise having to detect the off track condition from the PES itself. In some embodiments, the response time of the servo controller to detect the off track condition from the PES itself may not be able to initiate a write inhibit response in time to completely prevent the off track write from occurring. The use of status information for proactive write inhibit may prevent off track writes in a way that response to the PES itself cannot.

In time period 404, inhibit window 430 has a start 432 corresponding to the start of a seek recovery function (and corresponding state identifier) on the remote actuator. The actual coupling event 434 does not occur until the remote actuator is attempting to lock onto the servo pattern. Inhibit window 430 continues to an end 436 corresponding to the end of the seek recovery function (and the return of servo lock and normal operating modes).

Figure 5:
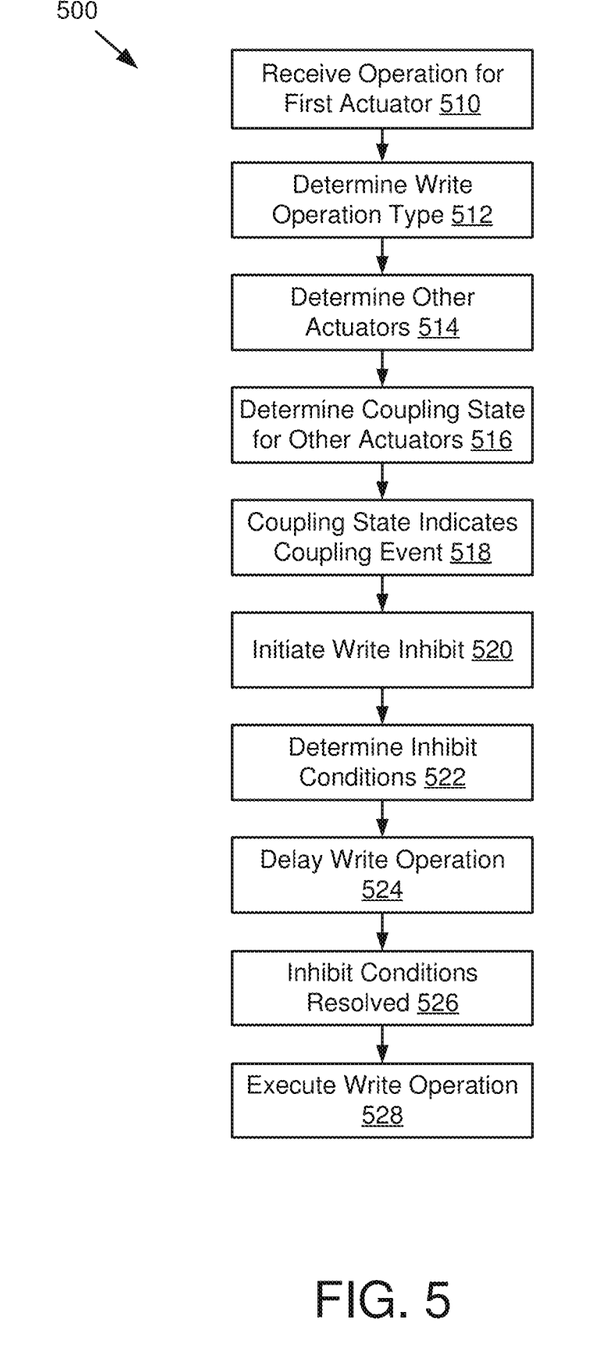
FIG. 5 is an example method of selectively inhibiting write operations during coupling events.

As shown in FIG. 5, control circuitry 300 may be operated according to an example method of selectively inhibiting write operations during coupling events, i.e., according to the method 500 illustrated by blocks 510-528.

At block 510, an operation may be received for a first actuator. For example, the controller may receive a host command corresponding to one or more read, write, or other storage operations targeting a storage location on a disk surface for a particular actuator.

At block 512, a write operation type may be determined. For example, the controller may parse the host command and determine a write operation type based on the host command parameters.

At block 514, at least one other actuator may be determined. For example, the controller may determine that at least one other actuator is present in the storage device and in an active state.

At block 516, coupling states may be determined for the at least one other actuator. For example, the controller may compare an operating mode of the other actuator to the operating mode indicated by the operation on the first actuator to determine whether a coupling state exists between the two operating modes.

At block 518, coupling state may indicate one or more coupling events. For example, the controller may use the coupling state and/or the respective operating modes to determine that one or more coupling events are indicated and should be avoided by altering the operating state of the first actuator.

At block 520, a write inhibit may be initiated. For example, the controller may determine that the coupling state may induce off-track writes during corresponding coupling events and initiate a write inhibit to prevent or delay write operations during an inhibit window calculated to include the (potential or actual) coupling events.

At block 522, inhibit conditions may be determined. For example, the controller may include logic for estimating the duration of the coupling state and/or determining other events, such as a state change of the remote actuator, that may be trigger conditions for ending the write inhibit mode.

At block 524, write operations may be delayed. For example, during the write inhibit window, the controller may prevent write operations from being executed through the first actuator and may, instead, hold the pending write operations in queue or reroute them according to other retry, allocation, and/or operation queueing policies in the controller.

At block 526, inhibit conditions may be resolved. For example, the controller may determine that a time duration for the coupling state has expired or a state change has occurred in the remote actuator that resolves the coupling state.

At block 528, write operations may be executed through the first actuator. For example, the controller may return from the write inhibit mode to a normal write operation mode and process pending or newly received write operations as normal.

Figure 6:
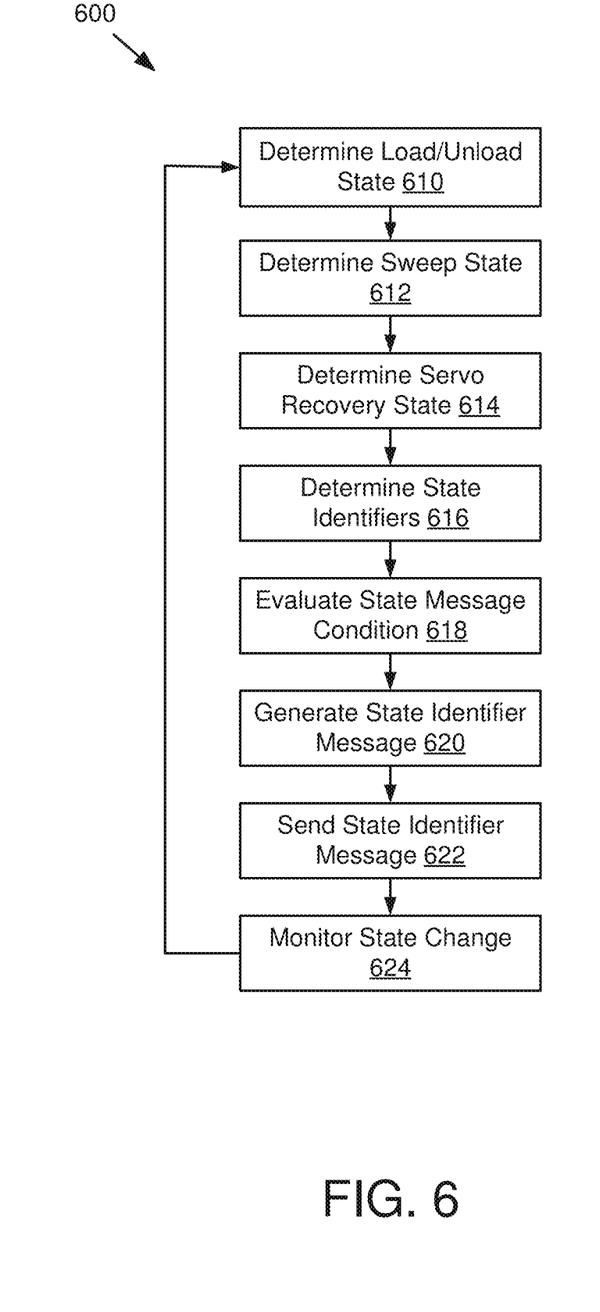
FIG. 6 is an example method of determining states of the remote actuator and notifying the local actuator of relevant state identifiers.

As shown in FIG. 6, control circuitry 300 may be operated according to an example method of determining states of the remote actuator and notifying the local actuator of relevant state identifiers, i.e., according to the method 600 illustrated by blocks 610-624.

At block 610, a load/unload state may be determined for an actuator. For example, the controller may include one or more state machines for determining the operating state of each actuator, including a state machine that determines load/unload related states.

At block 612, a sweep state may be determined for the actuator. For example, the controller may include a state machine that determines when sweep operations are initiated, in process, and complete, and may include distinct states for different types of sweep operations or portions of a sweep operation.

At block 614, a servo recovery state may be determined for the actuator. For example, the controller may include a state machine that determines when a servo recovery operation is initiated, in process, and complete, and may include distinct states for braking states and servo lock recovery states.

At block 616, at least one state identifier may be determined for the actuator. For example, the controller may maintain at least one state identifier for a present operating state of an actuator or its servo controller, such as a state identifier corresponding to one of the states determined at blocks 610-614.

At block 618, a state message condition may be evaluated. For example, the controller may evaluate whether the state identifier should be sent, broadcast, or otherwise selectively communicated to other actuators that may be impacted by the state (e.g., contributing to a coupling state with the operating mode of the other actuator), such as by meeting a state change condition, a timed state update cycle, or a conditional list of state identifiers subject to controller-to-controller notification.

At block 620, a state identifier message may be generated. For example, responsive to the state message conditions being met, the controller may generate a message to one or more other controllers for notifying them of the state identifier, such as a controller-to-controller message that includes the state identifier (and, if needed, a corresponding actuator identifier) in the payload of the message.

At block 622, the state identifier message may be sent. For example, the controller may send the message to one or more other controllers through a controller-to-controller communication interface.

At block 624, additional state changes may be monitored. For example, the controller may continue to monitor the operating states of the actuator and return to block 610 to periodically determine the states or detect state changes.

Figure 7:
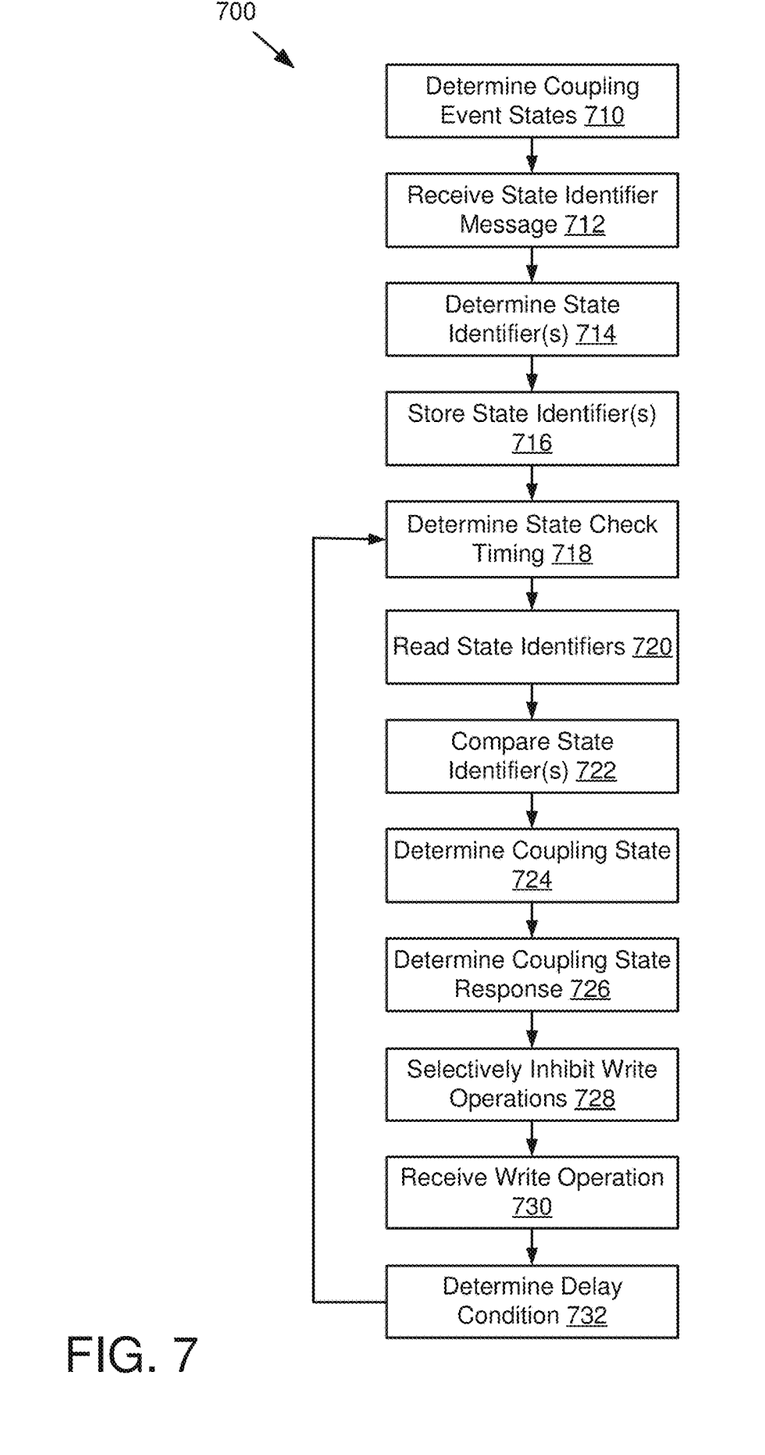
FIG. 7 is an example method of monitoring the states of other actuators for selectively inhibiting write operations based on coupling states.

As shown in FIG. 7, control circuitry 300 may be operated according to an example method of monitoring the states of other actuators for selectively inhibiting write operations based on coupling states, i.e., according to the method 700 illustrated by blocks 710-732.

At block 710, coupling event states may be determined. For example, the controller may be configured with a set of remote actuator state identifiers that correspond to coupling events with one or more operating modes of the local actuator and store the set of states in a lookup table or corresponding rules set for evaluating remote operating modes.

At block 712, a state identifier message may be received. For example, the controller may receive a state identifier message from another controller corresponding to a remote actuator.

At block 714, one or more state identifiers may be determined. For example, the controller may parse one or more state identifiers from the state identifier message.

At block 716, one or more state identifiers may be stored. For example, the controller may include a memory space or data structure for storing the state identifiers corresponding to one or more remote actuators for determining coupling states.

At block 718, state check timing may be determined. For example, the controller may be configured to check the remote state identifiers for possible coupling states on a periodic basis, such as per servo sector or servo wedge.

At block 720, one or more state identifiers may be read. For example, the controller may, responsive to the state check timing, check the remote state identifiers stored at block 716.

At block 722, state identifiers may be compared. For example, the stored state identifiers corresponding to the most recent state of the remote actuators may be compared against the set of state identifiers determined at block 710.

At block 724, a coupling state may be determined. For example, at least one of the stored state identifiers may match a state identifier in the set of state identifiers corresponding to coupling states with the operating mode of the local actuator.

At block 726, a coupling state response may be determined. For example, the controller may include logic indexed by the particular remote state identifier and/or operating mode or state of the local actuator to determine a response for compensating for predicted coupling events.

At block 728, write operations may be selectively inhibited. For example, during a write inhibit window responsive to the coupling state determined at block 724, write operations may be delayed or rejected (effectively delaying them until retry or execution on a different actuator) until normal write operations are restored.

At block 730, a write operation may be received. For example, the controller may receive or determine a write operation targeting the disk surfaces for the local actuator.

At block 732, the delay condition for the write operation may be determined. For example, the write operation may be held in queue until the write inhibit window ends or the write operation may be rejected and retried at a later time based on the controller's retry logic.

Technology for improved data protection in multiple actuator data storage devices using monitoring of coupling states across actuators during concurrent operations is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device, comprising:
   a plurality of disk surfaces;
   a first actuator configured to actuate a first plurality of heads over a first subset of the plurality of disk surfaces;
   a second actuator configured to actuate a second plurality of heads over a second subset of the plurality of disk surfaces; and
   control circuitry configured to:
      receive a write command for the first actuator;
      determine a coupling state of the second actuator; and
      inhibit, responsive to the coupling state, execution of the write command.

2. The data storage device of claim 1, wherein:
   the control circuitry is further configured to:
      determine at least one state identifier for the second actuator; and compare the at least one state identifier to a set of state identifiers corresponding to coupling events between the first actuator and the second actuator; and determining the coupling state is based on the comparison of the at least one state identifier to the set of state identifiers.

3. The data storage device of claim 2, wherein the set of state identifiers are selected from state identifiers corresponding to at least one of the following:

load/unload state identifiers of the second actuator;
sweep operation state identifiers of the second actuator; and
servo error recovery state identifiers of the second actuator.

4. The data storage device of claim 2, wherein the coupling events between the first actuator and the second actuator include mechanical coupling events and electrical coupling events.

5. The data storage device of claim 2, wherein:
the control circuitry comprises:
a first controller configured to control the first actuator; and
a second controller configured to control the second actuator;
the second controller is configured to:
determine the at least one state identifier for the second actuator; and
send, to the first controller, the at least one state identifier for the second actuator; and
the first controller is configured to:
determine the coupling state of the second actuator; and
inhibit, responsive to the coupling state, execution of the write command.

6. The data storage device of claim 5, wherein the first controller is further configured to:
store the at least one state identifier received from the second controller;
read, responsive to receiving the write command, the at least one state identifier; and
compare the at least one state identifier to the set of state identifiers to determine the coupling state of the second actuator.

7. The data storage device of claim 5, wherein the second controller is further configured to selectively send, based on a set of message notification conditions, the at least one state identifier to the first controller.

8. The data storage device of claim 2, wherein inhibiting execution of the write command includes determining, based on the at least one state identifier, a delay condition before the write command is executed.

9. The data storage device of claim 1, wherein the control circuitry is further configured to determine the coupling state of the second actuator on a per servo sector basis.

10. The data storage device of claim 1, further comprising:
a plurality of additional actuators configured to actuate additional pluralities of heads over additional subsets of the plurality of disk surfaces, wherein the control circuitry is further configured to:
determine a coupling state for each actuator of the plurality of additional actuators; and
inhibit, responsive to the coupling state of at least one actuator of the plurality of additional actuators, execution of the write command.

11. A method comprising:
receiving, by a data storage device, a write command for a first actuator, wherein the data storage device comprises:
a plurality of disk surfaces;
the first actuator configured to actuate a first plurality of heads over a first subset of the plurality of disk surfaces; and
a second actuator configured to actuate a second plurality of heads over a second subset of the plurality of disk surfaces;
determining a coupling state of the second actuator; and
inhibiting, responsive to the coupling state, execution of the write command.

12. The method of claim 11, further comprising:
determining at least one state identifier for the second actuator; and
comparing the at least one state identifier to a set of state identifiers corresponding to coupling events between the first actuator and the second actuator, wherein determining the coupling state is based on the comparison of the at least one state identifier to the set of state identifiers.

13. The method of claim 12, wherein the set of state identifiers are selected from state identifiers corresponding to at least one of the following:
load/unload state identifiers of the second actuator;
sweep operation state identifiers of the second actuator; and
servo error recovery state identifiers of the second actuator.

14. The method of claim 12, wherein the coupling events between the first actuator and the second actuator include mechanical coupling events and electrical coupling events.

15. The method of claim 12, further comprising:
determining, by a second controller configured to control the second actuator, the at least one state identifier for the second actuator;
sending, from the second controller to a first controller, the at least one state identifier for the second actuator;
determining, by the first controller configured to control the first actuator, the coupling state of the second actuator from the at least one state identifier; and
inhibiting, by the first controller and responsive to the coupling state, execution of the write command.

16. The method of claim 15, further comprising:
storing, by the first controller, the at least one state identifier received from the second controller;
reading, by the first controller and responsive to receiving the write command, the at least one state identifier; and
comparing, by the first controller, the at least one state identifier to the set of state identifiers to determine the coupling state of the second actuator.

17. The method of claim 15, wherein sending, from the second controller to the first controller, comprises:
evaluating, by the second controller, a set of message notification conditions; and
selectively sending, based on the set of message notification conditions, the at least one state identifier to the first controller.

18. The method of claim 12, wherein inhibiting execution of the write command includes determining, based on the at least one state identifier, a delay condition before the write command is executed.

19. The method of claim 11, wherein determining the coupling state of the second actuator is executed on a per servo sector basis.

20. A data storage device comprising:
a plurality of disk surfaces;
a first actuator configured to actuate a first plurality of heads over a first subset of the plurality of disk surfaces;
a second actuator configured to actuate a second plurality of heads over a second subset of the plurality of disk surfaces;
means for receiving a write command for the first actuator;
means for determining a coupling state of the second actuator; and
means for inhibiting, responsive to the coupling state, execution of the write command.

* * * * *